(12) United States Patent
Montierth et al.

(10) Patent No.: US 8,903,300 B2
(45) Date of Patent: Dec. 2, 2014

(54) MULTI-FUNCTION DEVICE ARCHITECTURE

(75) Inventors: Mark D. Montierth, Meridian, ID (US);
Douglas G. Keithley, Boise, ID (US);
Richard D. Taylor, Eagle, ID (US)

(73) Assignee: Marvell World Trade Ltd., St. Michael (BB)

( * ) Notice: Subject to any disclaimer, the term of this patent is extended or adjusted under 35 U.S.C. 154(b) by 837 days.

(21) Appl. No.: 12/543,209

(22) Filed: Aug. 18, 2009

(65) Prior Publication Data

US 2010/0047001 A1 Feb. 25, 2010

Related U.S. Application Data

(60) Provisional application No. 61/090,063, filed on Aug. 19, 2008.

(51) Int. Cl.
| | |
|---|---|
| *H04N 1/00* | (2006.01) |
| *H04N 1/04* | (2006.01) |
| *H04N 1/10* | (2006.01) |
| *H04N 1/195* | (2006.01) |
| *G03G 21/16* | (2006.01) |

(52) U.S. Cl.
CPC .............. *H04N 1/10* (2013.01); *H04N 1/00525* (2013.01); *G03G 2215/0404* (2013.01); *H04N 1/195* (2013.01); *G03G 21/1666* (2013.01); *H04N 2201/0091* (2013.01); *H04N 2201/0094* (2013.01); *G03G 2221/1636* (2013.01)
USPC .......................................... 399/365; 399/363

(58) Field of Classification Search
CPC ...... H04H 1/10; H04N 1/195; H04N 1/00525
USPC ......... 399/365, 378, 375, 368, 369, 367, 363; 358/472; 400/76; 347/152, 176
IPC .................................. H04N 1/029, 1/03, 1/031
See application file for complete search history.

(56) References Cited

U.S. PATENT DOCUMENTS

| | | | |
|---|---|---|---|
| 4,277,163 A * | 7/1981 | Ikesue et al. ..................... 399/86 |
| 4,941,015 A | 7/1990 | Koma et al. |
| 5,886,659 A * | 3/1999 | Pain et al. ...................... 341/155 |
| 5,907,413 A * | 5/1999 | Han ................................ 358/497 |
| 6,304,742 B1 | 10/2001 | Nunes et al. |
| 6,407,830 B1 * | 6/2002 | Keithley et al. ................ 358/514 |
| 6,747,764 B1 | 6/2004 | Chu |
| 7,190,495 B2 * | 3/2007 | Lam .............................. 358/474 |

(Continued)

FOREIGN PATENT DOCUMENTS

| | | | |
|---|---|---|---|
| DE | 19530841 A1 * | 4/1996 | |
| JP | 1152349 | 6/1989 | |

(Continued)

*Primary Examiner* — Judy Nguyen
*Assistant Examiner* — Jennifer Simmons

(57) ABSTRACT

Embodiments of the present invention provide a multi-function device including a housing, a printing assembly disposed within the housing, the printing assembly being configured to print a document, and a copying assembly comprising a complementary metal-oxide-semiconductor (CMOS) image sensor and an illumination source disposed within the housing, the copying assembly further including a substantially flat transparent surface disposed in an optical path of the CMOS image sensor, the substantially flat transparent surface to support an object for image capture by the CMOS image sensor, wherein the illumination source is configured to provide illumination during image capture. Other embodiments may be described and/or claimed.

20 Claims, 3 Drawing Sheets

(56) References Cited

U.S. PATENT DOCUMENTS

| | | |
|---|---|---|
| 2007/0013954 A1* | 1/2007 | Soeda et al. ............ 358/3.26 |
| 2007/0081065 A1* | 4/2007 | Ootsuka et al. ............ 347/104 |
| 2007/0097411 A1* | 5/2007 | Kondo et al. ............ 358/1.14 |
| 2007/0177000 A1 | 8/2007 | Lee |
| 2008/0024836 A1 | 1/2008 | Sundned |
| 2008/0180754 A1 | 7/2008 | Miller |

FOREIGN PATENT DOCUMENTS

| | | |
|---|---|---|
| JP | 04192659 | 7/1992 |
| JP | 8 211705 A | 8/1996 |
| JP | 08227452 | 9/1996 |
| JP | 200136697 | 2/2001 |

* cited by examiner

MULTI-FUNCTION DEVICE ARCHITECTURE

CROSS REFERENCE TO RELATED APPLICATIONS

The present application claims priority to U.S. Patent Application No. 61/090,063, filed Aug. 19, 2008, entitled "An Architecture for Using an Area Array CMOS Image Sensor in a Low-Cost Multi-Function Printer/Copier," the entire specification of which is hereby incorporated by reference in its entirety for all purposes, except for those sections, if any, that are inconsistent with this specification.

TECHNICAL FIELD

Embodiments of the present invention relate to the field of multi-function printing devices, and more particularly, to architecture and configurations of a variety of components of a multi-function device.

BACKGROUND

Generally, home and office computing environments are rapidly embracing the convenience and cost savings of multi-function devices (MFDs) such as multi-function printers (MFPs). MFDs typically incorporate mechanisms for printing, copying, scanning, and/or faxing and may additionally include capabilities to scan or copy directly to email, memory cards, or other forms of storage. MFDs can print images, for example, from a directly or network connected computer or other connected electronic device. Increasingly, MFDs include wireless interfaces for remote printing.

MFD products from the lowest-cost spectrum may be primarily used for printing, with an occasional copy or scan. As manufacturers attempt to further lower the cost of MFDs, there may be a strong desire to maintain print quality and performance and a willingness to reduce copy or scan features or quality to significantly reduce product cost. Such motive may be particularly pronounced in the case of monochrome products, where quality requirements for scanning are generally less stringent.

Current lower-cost MFDs generally incorporate, for example, a flatbed scanner, a page-fed scanner, or combinations thereof. A page-fed scanner, while typically offered at a lower cost, is generally unable to scan odd or irregular shaped items such as receipts. In contrast, a flatbed scanner (not including a page feeder) cannot easily copy a multi-page document. Current laser MFDs may, for example, utilize folded optics or contact image sensor (CIS) configurations to perform a document scanning function. Such scan sensors typically capture only a single line of data at a time. In a page-fed scanner, a document typically passes over a fixed sensor assembly during scanning; and in a flatbed scanner, a scan sensor (driven by a motor) sweeps under a still document during scanning.

Conventional low-cost laser flatbed MFDs are generally based on a standalone laser printer mechanism, including a separate scan bed (for a flatbed scanner), which is not integrated into the architectural design of the printer. The flatbed scanner is typically stacked above the printer using, for example, side-posts to allow a paper path and mechanism of the printer to remain unaffected. Such an arrangement may result in a bulky and/or unattractive product, which may translate into higher material and shipping costs.

SUMMARY

The present disclosure provides a multi-function device including a housing, a printing assembly disposed within the housing, the printing assembly being configured to print a document, and a copying assembly comprising a complementary metal-oxide-semiconductor (CMOS) image sensor and an illumination source disposed within the housing, the copying assembly further including a substantially flat transparent surface disposed in an optical path of the CMOS image sensor, the substantially flat transparent surface to support an object for image capture by the CMOS image sensor, wherein the illumination source is configured to provide illumination during image capture.

According to various embodiments, the housing includes a substantially flat surface to facilitate placement of the multi-function device on a substantially flat surface external to the multi-function device, the substantially flat surface of the housing being substantially parallel with the substantially flat transparent surface of the copying assembly, and the CMOS image sensor is disposed between the substantially flat surface of the housing and the substantially flat transparent surface of the copying assembly within an area of the housing of the multi-function device where the printing assembly is disposed According to various embodiments, the printing assembly includes a laser module for laser printing and an optical photoconductor operatively coupled with the laser module, the multi-function device further including an input tray to receive a document for printing by the printing assembly, a pick mechanism to move the document through a printing pathway, and a cover coupled to the multi-function device wherein the cover is configured to move to an open position and a closed position, cover the substantially flat transparent surface of the copying assembly, and function as an output tray for the document while in the closed position.

The present disclosure further provides a method of assembling a multi-function device, the method including providing a housing, configuring a printing assembly within the housing to print a document, and configuring a copying assembly comprising a complementary metal-oxide semiconductor (CMOS) image sensor, wherein the CMOS image sensor is disposed within the housing, the copying assembly further including an illumination source disposed within the housing to provide illumination during image capture, and a substantially flat transparent surface disposed in an optical path of the CMOS image sensor, the substantially flat transparent surface to support an object for image capture by the CMOS image sensor.

According various embodiments, providing the housing includes providing a substantially flat surface of the housing to facilitate placement of the multi-function device on a substantially flat surface external to the multi-function device, the substantially flat surface of the housing being substantially parallel with the substantially flat transparent surface of the copying assembly, wherein the CMOS image sensor is disposed between the substantially flat surface of the housing and the substantially flat transparent surface of the copying assembly within an area of the housing of the multi-function device where the printing assembly is disposed.

According to various embodiments, configuring the printing assembly includes configuring a laser module for laser printing, and configuring an optical photoconductor to be operatively coupled with the laser module, wherein the method of assembling the multi-function device further includes configuring an input tray to receive a document for printing by the printing assembly, configuring a pick mechanism to move the document through a printing pathway, and coupling a cover to the multi-function device, wherein the cover is configured to move to an open position and a closed position, cover the substantially flat transparent surface of the copying assembly and, function as an output tray for the document while in the closed position.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Embodiments of the present invention may describe configurations of various components of a multi-function device architecture and associated techniques. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description below includes use of perspective-based descriptions such as bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)."

The description incorporates use of the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
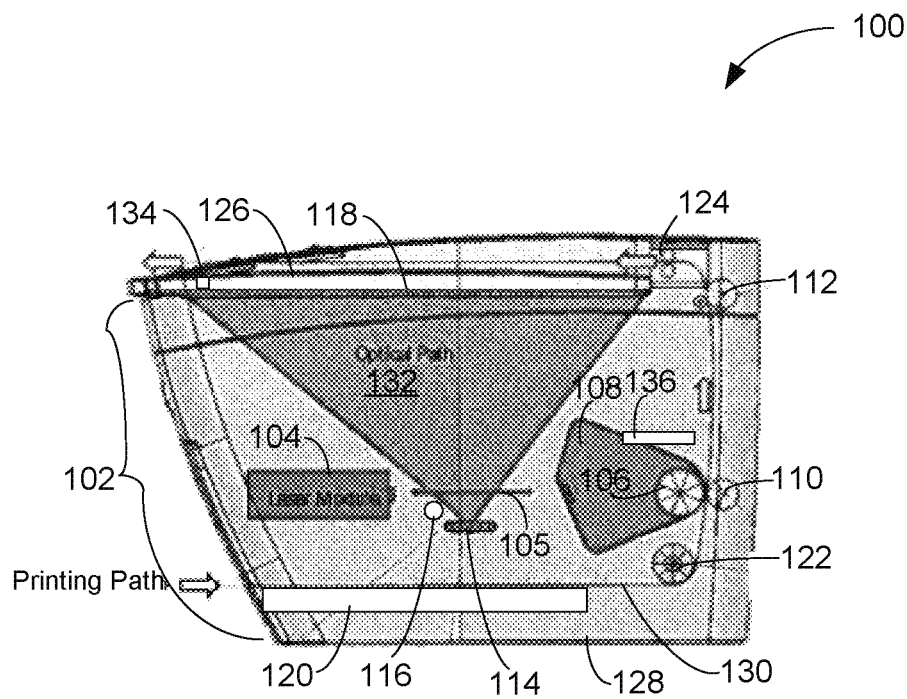
FIG. 1 is a schematic diagram of a multi-function device, in accordance with various embodiments of the present invention.

FIG. 1 is a schematic diagram of a multi-function device (MFD) 100, in accordance with various embodiments of the present invention. MFD 100 includes housing 102, laser module 104, optical photoconductor (OPC) 106, OPC cartridge 108, transfer mechanism 110, fuser 112, area array complementary metal-oxide-semiconductor (CMOS) image sensor 114, illumination source 116, transparent surface 118, input tray 120, pick mechanism 122, guides 124, and cover/output tray 126, coupled as shown. According to various embodiments, MFD 100 may include more or less components than depicted.

MFD 100 includes housing 102 to substantially cover one or more components of the MFD 100, such as, for example, components of a printing assembly or copying assembly. Housing 102 substantially protects components within the housing 102 from exposure to undesirable elements such as light, dust, or other debris, and may also protect unsightly or dangerous mechanisms of the MFD 100 from a user's view or touch. In an embodiment, housing 102 includes a substantially flat surface 128, to facilitate placement of the MFD 100 on a substantially flat surface external to the MFD 100.

MFD 100 can comprise a printing assembly disposed within the housing 102. The printing assembly can be configured to print one or more documents and may include a variety of components associated with printing one or more documents. The type of printing assembly components may depend on a printing technology used by the MFD 100. For example, MFD 100 can include a printing assembly in accordance with laser and/or inkjet technologies. Other printing technologies may be supported in other embodiments.

In the depicted embodiment of FIG. 1, MFD 100 includes a laser module 104 for laser printing technology. Laser module 104 generates a laser beam 105 to project an image onto a photoconductor such as organic photoconductor (OPC) 106. OPC 106 can comprise, for example, an electrically charged rotating drum. OPC 106 is accompanied by a cartridge 108. Cartridge 108 protects OPC 106 and/or provides other functionality associated with laser printing such as, for example, associated optics or mirrors for scanning or beam alignment.

The laser beam 105 alters a charge on areas of OPC 106 according to a desired image, whereupon particles such as dry ink or toner are electrostatically attracted to the OPC 106 according to the desired image. OPC 106 is pressed or rolled over one or more documents at transfer mechanism 110. A fuser 112 applies heat and pressure to bond the dry ink or toner to the one or more documents. One or more documents may comprise paper in one or more embodiments, but is not limited in this regard and may include other printing media in other embodiments.

In FIG. 1, an example printing path 130 is indicated by associated directional arrows. Printing path 130 is a path through MFD 100 that a document follows while undergoing a printing process. MFD 100 includes an input tray 120 to receive or hold one or more documents for printing by a printing assembly of MFD 100. Pick mechanism 122 moves the one or more documents through a printing pathway 130 to undergo printing actions including, for example, the actions described with respect to laser module 104, OPC 106, transfer mechanism 110, and/or fuser 112. Guides 124 guide the one or more documents to cover/output tray 126. Cover/output tray 126 can be a dual purpose structure configured to cover an adjacent transparent surface 118 used for copying and also configured to serve as an output tray for one or more printed documents.

MFD 100 comprises a copying assembly having an area array CMOS image sensor 114 and an illumination source 116 disposed within the housing 102. The copying assembly can be integrated to share a same area as a printing assembly in one or more embodiments. For example, area array CMOS image sensor 114 and illumination source 116 of the copying assembly can share an area of MFD 100 with components of a printing assembly such as laser module 104, OPC 106, and/or transfer mechanism 110. In at least one embodiment of sharing an area of MFD 100, one or more components of the copying assembly (e.g., CMOS image sensor 114 and illumination source 116) may be positioned within the housing 102 at a height or level equal to or below one or more components of the printing assembly (e.g., the laser module 104, the OPC 106, and/or the transfer mechanism 110) as depicted in FIG. 1.

Area array CMOS image sensor 114 is intended to represent a variety of image sensors such as those that are widely employed, for example, in the use of cell phone cameras. Area array CMOS image sensor 114 is also referred to herein as a full array, area array, or CMOS image sensor, or combinations thereof. In an embodiment CMOS image sensor comprises an active pixel sensor (APS). Hereinafter, area array CMOS image sensor 114 is referred to as "CMOS image sensor" 114. The term "CMOS", as used in the phrase "CMOS image sensor" herein, may refer to a commonly used trade name of an image sensor type to distinguish the image sensor from other types of image sensors such as, for example, linear array contact image sensor (CIS) and/or charge coupled device (CCD) sensors.

Although the term "CMOS" may conventionally refer to a particular manufacturing process to form a device from various materials, the term CMOS as used within this description is not limited to any particular manufacturing process. For example, the phrase "metal-oxide-semiconductor" in the term "CMOS" may conventionally refer to a physical structure of field-effect transistors where a metal gate is formed on an oxide material, which is formed on a semiconductor. Materials other than traditional metals, oxides, and semiconductors may be employed to form analogous devices in emerging semiconductor technologies, however such physical structure may still be referred to as a CMOS device by convention or trade usage. Similarly, "CMOS" as used herein is intended to include image device sensors, for example, that are formed according to emerging semiconductor technologies that utilize such different material structures.

CMOS image sensor 114 is configured to capture one or more images for copying. In an embodiment, CMOS image sensor 114 is configured to capture an entire image of a document at once. For example, CMOS image sensor 114 may not require scanning of one or more documents to capture an image as used in linear array technologies. In an embodiment, CMOS image sensor 114 comprises an optical path 132 that allows image capture of one or more objects placed on a transparent surface 118 of MFD 100.

CMOS image sensor 114 can be configured to provide low distortion at a short focal depth. Such CMOS image sensor 114 may allow off-center positioning of the CMOS image sensor 114 with respect to transparent surface 118.

A copying assembly of MFD 100 further comprises a substantially flat transparent surface 118 disposed in an optical path 132 of CMOS image sensor 114 to support an object for image capture by the CMOS image sensor 114. An object for image capture may comprise a variety of articles including, for example, one or more documents, photographs, or three-dimensional objects. Substantially flat transparent surface 118 can comprise glass, plastic, or any other suitable material to provide a substantially flat, transparent surface for imaging/copying.

In an embodiment, the substantially flat transparent surface 118 of the copying assembly is substantially parallel with the substantially flat surface 128 of the housing 102. CMOS image sensor 114 is disposed between the substantially flat transparent surface 118 of the copying assembly and the substantially flat surface 128 of the housing 102, within an area of the housing 102 where the printing assembly is disposed.

MFD 100 further comprises a cover 126 coupled to the MFD 100 such that the cover 126 can move to an "open" position and a "closed" position. In the open position, the cover 126 substantially exposes the transparent surface 118; and in the closed position, the cover 126 substantially covers the transparent surface 118. The cover 126 can further be configured to function as an output tray for one or more printed documents in the closed position. For example, guides 124 can output a printed document onto a surface of cover 126. A printed document can be removed by a user, for example, before cover 126 is opened.

MFD 100 further includes an interlock 134 operatively coupled with the cover 126 and configured to disable laser module 104 when the cover 126 is in an open position. Interlock 134 can comprise a mechanical or electrical interlock, or combinations thereof, according to one or more embodiments. Interlock 134 can comprise a same mechanism to disable laser module 104 that may be used when MFD 100 is opened for maintenance or troubleshooting purposes including, for example, changing a cartridge 108 or clearing a paper jam. In one or more embodiments, transparent surface 118 further comprises a filter coating to block laser light of the laser module 104 from exiting through the transparent surface 118 of the copying assembly. Combinations of such features may be implemented according to various embodiments. Such features may increase safety of using a laser printing module 104 by preventing or reducing laser exposure through transparent surface 118.

A variety of features may be implemented in MFD 100 to protect OPC 106 from excessive light exposure. In an embodiment, OPC 106 is configured to rotate when the cover 126 is in the open position and/or when the illumination source 116 is enabled to reduce localized overexposure of the OPC 106 to ambient or illuminative light. MFD 100 further comprises a shade structure 136 operatively coupled with the cover 126 to prevent or reduce exposure of the OPC 106 to ambient light when the cover 126 is in the open position. For example, an interlock 134 can indicate that the cover is open, which may cause a signal to be sent to move shade structure 136 into a position that protects OPC 106 from light that may enter through transparent surface 118. Shade structure 126 comprises a shutter mechanism in an embodiment.

MFD 100 further comprises an illumination source 116 disposed within the housing 102. Illumination source 116 can comprise any of a variety of light sources to provide sufficient light to allow image capture by CMOS image sensor 114. In an embodiment, illumination source 116 includes one or more light-emitting diodes (LEDs) and/or cold cathode fluorescent lamps (CCFLs) and can include one or more color or white lights.

A number of image processing techniques may be used to increase native resolution of CMOS image sensor 114. In an embodiment, MFD 100 is configured to capture multiple images using CMOS image sensor 114, which may be combined to yield an enhanced image having higher effective resolution, less noise, and improved contrast. In an embodiment, MFD 100 is configured to capture multiple images using different exposure times and/or illuminations levels of illumination source 116. Image processing techniques can include well-known techniques to increase native resolution of an image by combining multiple images captured by CMOS image sensor 114. Illumination source 116 can be configured to provide longer exposure times to allow a lower-cost illumination source 116.

Multiple images can be captured using slightly varied CMOS image sensor 114 placement according to one or more embodiments. Such micro-positioning may be accomplished, for example, by mounting CMOS image sensor 114 on an oscillating transducer, fixed-detent actuator, or flexible strut or spring, or combinations thereof. Captured images can be aligned for image processing using position data from one or more fiduciaries coupled with MFD 100 to provide CMOS image sensor 114 position feedback. Fiduciaries can comprise markings that are configured to facilitate determination of the location of a desired image in a captured image, which may obviate a need for more complex correlation type functions to combine captured images. CMOS image sensor 114 can be mounted in a fixed or semi-fixed location according to various embodiments.

Combinations of image processing techniques can be used in one or more embodiments. For example, in an embodiment, a copying assembly of MFD 100 is configured to increase an image resolution by capturing multiple images of an object using different exposure times and/or illumination levels and/or using slightly varied CMOS image sensor 114 positioning. MFD 100 or another external electronic device comprising a processor can be configured to further align the multiple images for image processing using information obtained from one or more fiduciaries disposed within the housing 102 for CMOS image sensor 114 position feedback, and to combine the multiple images to produce an enhanced comprehensive image.

Image quality may be increased by using sequential color illumination techniques in one or more embodiments. For example, a color mosaic filter within the CMOS image sensor 114 can be removed or not implemented at all to increase sensitivity of optical sensor elements of CMOS image sensor 114. A CMOS image sensor 114 without a color mosaic filter may also increase resolution because there may be no need for a demosaic algorithm to reconstruct a captured image. In an embodiment, illumination source 114 is configured to provide a different color of illumination for each of multiple sequential images captured by the CMOS image sensor 114 to allow reconstruction of a color image using data of the illuminant color used to capture each image. In an embodiment, illumination source 114 is configured to capture one or more sequential images using a green light, a red light, and/or a blue light, in any order.

A variety of techniques may be implemented to reduce or remove illumination source 116 reflections. A technique to reduce reflection according to various embodiments of the present invention is described in connection with FIG. 3.

In an embodiment, illumination source 116 is configured to pre-condition the OPC 106 to reduce charging circuit sensitivity to previous images, including ghosting effects. For example, optics/mirrors and associated mechanisms can be assembled to direct light from illumination source 116 to OPC 106 during a printing process for pre-conditioning purposes.

Figure 2:
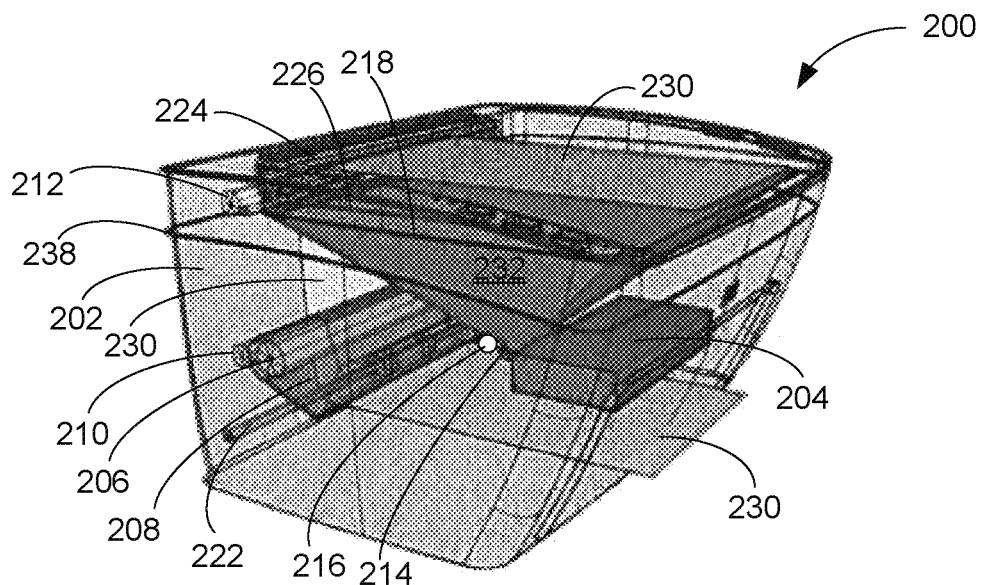
FIG. 2 is a schematic diagram of a multi-function device from another view, in accordance with various embodiments of the present invention.

FIG. 2 is a schematic diagram of a multi-function device (MFD) 200 from another view, in accordance with various embodiments of the present invention. FIG. 2 depicts MFD 200 from another view to further clarify configurations and arrangements described with respect to MFD 100 of FIG. 1. In an embodiment, MFD 200 includes housing 202, laser module 204, optical photoconductor (OPC) 206, OPC cartridge 208, transfer mechanism 210, fuser 212, CMOS image sensor 214, illumination source 216 transparent surface 218, pick mechanism 222, guides 224, and cover/output tray 226, arranged as shown. FIG. 2 further depicts an optical path 232 of CMOS image sensor 214 and a printing path 230 of MFD 200. Components of MFD 200 may accord with embodiments already described with respect to like components of MFD 100. According to various embodiments, multi-function device 200 may include more or less components than depicted.

In an embodiment, housing 102 is configured to allow a portion of MFD 200 that includes transparent surface 218 to open or be removed to allow access to internal components such as laser module 204, CMOS image sensor 214, illumination source 216, OPC 206, cartridge 208, or one or more documents on paper path 230 for troubleshooting and/or maintenance purposes. An upper portion of MFD 200 is delineated by peripheral marker 238 and the upper portion can be coupled to a bottom portion of MFD 200 by one or more hinges or similar mechanisms to allow MFD 200 to open for troubleshooting or maintenance.

Within MFD 200, a copying assembly is merged and/or integrated into a printing assembly, in contrast to a conventional MFD in which a copying assembly is typically placed onto a printing assembly. Accordingly, an architecture of MFD 200 can have a smaller size than conventional MFDs, which may result in lower material cost, lower packaging, storage, and shipping costs, and/or the addition of copying capability with only a slight size increase from a sole printing device. An MFD 200 in accordance with embodiments described herein may have fewer moving parts than an MFD incorporating, for example, a scanning device, resulting in quieter operation and/or increased reliability.

The use of CMOS image sensor 214 type sensors can leverage wide-scale production of image sensors for camera phones, which may provide a lower cost solution, particularly as resolution for these sensors improves over time. Page-at-once scanning, as provided by MFD 200 in one or more embodiments, may yield faster copies than traditional scanning devices that typically drive a sensor across a page or a page across a sensor to scan a line of data at a time.

Figure 3:
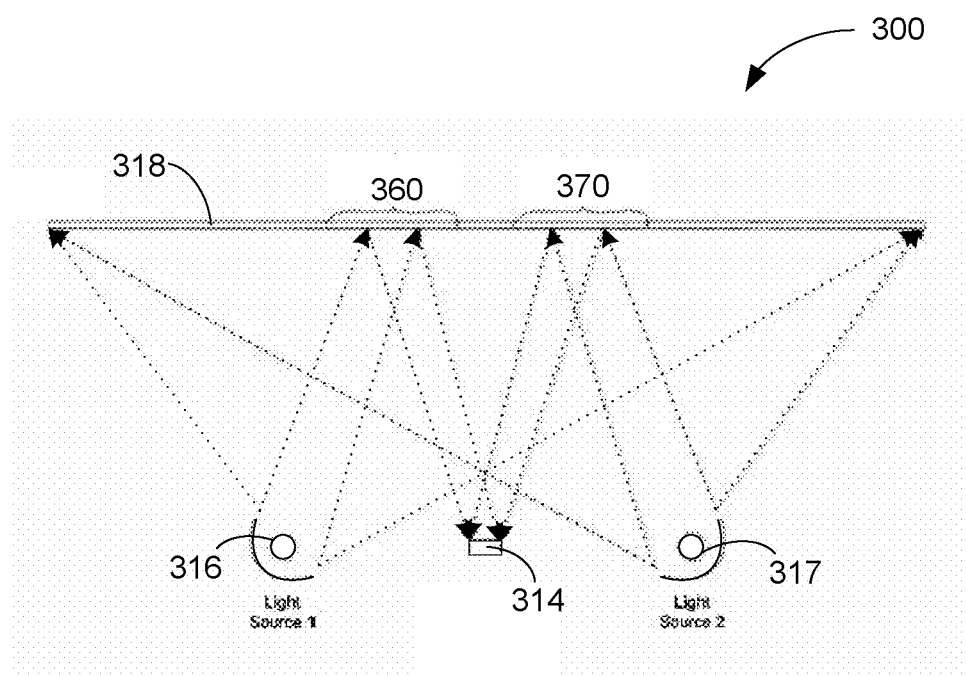
FIG. 3 is a schematic diagram of a technique to reduce reflections from a source illumination.

FIG. 3 is a schematic diagram of a technique to reduce reflections from an illumination source. The illumination source includes two or more light sources 316, 317 for each color of light to reduce or eliminate the effects of reflection. CMOS image sensor 314 may comport with embodiments described with respect to CMOS image sensor 114 or CMOS image sensor 214, first light source 316 and second light source 317 may comport with embodiments described with respect to illumination source 116 or illumination source 216, and transparent surface 318 may comport with embodiments described with respect to transparent surface 118 or transparent surface 218.

Placement of an illumination source within an MFD as described herein may be constrained by a wide field of view of CMOS image sensor 314. For example, placement of an illumination source too near or adjacent the transparent surface 318 outside of view of the CMOS image sensor 314 may result in a very shallow illumination angle that may require significant cost and complexity to achieve uniform illumination.

Placement of light sources 316, 317 as depicted in FIG. 3 may result in detected reflection at area 360 where light from a first light source 316, indicated by directional arrows, reflects at transparent surface 318 and is detected by CMOS image sensor 314. Such detected reflection may result in glare in a captured image. Similarly, light from a second light source 317 may reflect at transparent surface 318 resulting in an area of detected reflection 370.

In an embodiment, two or more light sources 316, 317 for each color of illumination are positioned at different locations that cause detected reflection at areas 360, 370 to be captured at different locations by the CMOS image sensor 314. By sequentially illuminating each light source 316, 317 and capturing respective images for each illumination, detected reflection at areas 360, 370 can be eliminated in a combined image. For example, detected reflection at areas 360, 370 can be determined algorithmically or by empirical characterization of the mechanism. Image processing can be used to reduce or eliminate the known areas of reflection 360, 370 in a combined image according to well-known techniques.

Figure 4:
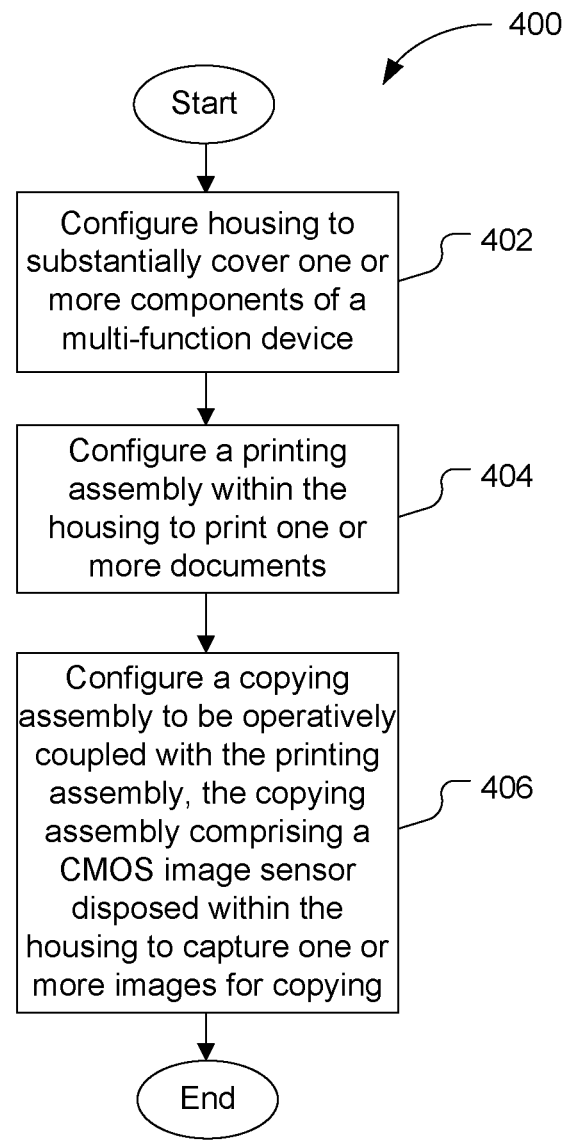
FIG. 4 is a process flow diagram of a method to assemble a multi-function device, in accordance with various embodiments of the present invention.

FIG. 4 is a process flow diagram of a method to assemble a multi-function device (MFD), in accordance with various embodiments of the present invention. Method 400 includes configuring a housing to substantially cover one or more components of a MFD at block 402, configuring a printing assembly within the housing to print one or more documents at block 404, and configuring a copying assembly comprising a CMOS image sensor such that the CMOS image sensor is disposed within the housing to capture one or more images for copying at block 406.

In an embodiment, configuring the housing comprises providing a substantially flat surface of the housing to facilitate placement of the MFD on a substantially flat surface external to the MFD. The substantially flat surface of the housing can be configured to be substantially parallel with the substantially flat transparent surface of the copying assembly, or vice versa. The CMOS image sensor can be disposed between the substantially flat surface of the housing and the substantially flat transparent surface of the copying assembly, within an area of the housing of the MFD where the printing assembly is disposed. A printing assembly and copying assembly can be integrated together to share a working space within a cavity of the MFD.

The printing assembly can be configured by configuring a laser module for laser printing within the housing of the MFD and configuring an optical photoconductor (OPC) to be operatively coupled with the laser module. The OPC can be operatively coupled to the laser module, for example, by receiving laser light from the laser module during a printing operation.

Assembling the MFD according to method 400 can further comprise configuring an input tray to receive one or more documents for printing by the printing assembly and configuring a pick mechanism to move the one or more documents through a printing pathway. The MFD assembly can further include coupling a cover to the multi-function device such that the cover can move to an open position and a closed position. The cover can be configured to cover the substantially flat transparent surface of the copying assembly and/or to function as an output tray for the one or more documents in the closed position.

Assembling the MFD can further comprise configuring an interlock to disable the laser module when the cover is in an open position, or providing a filter coating on the substantially flat transparent surface to block laser light of the laser module, or combinations thereof. Configuring the interlock and/or providing the filter coating may reduce or prevent laser light of the laser printing assembly from exiting through the substantially flat transparent surface of the copying assembly. The above-described safety features may reduce potential harm to a user of the MFD from laser exposure.

The OPC can be configured during assembly of the MFD to rotate when the cover is in the open position and/or when the illumination source is enabled to reduce exposure of the OPC to ambient or illuminative light. The method 400 to assemble the MFD can further include configuring a shade structure to be operatively coupled with the cover to operate to prevent or reduce exposure of the OPC to ambient light when the cover is in the open position. The shade structure can be configured to operate according to a shutter mechanism according to one embodiment.

Configuring the copying assembly can comprise configuring the illumination source to pre-condition the optical photoconductor to reduce ghosting effects associated with laser printing. Optics and/or mirrors may be used, for example, to direct light from the illumination source to the OPC during a printing process to reduce charge aberrations on OPC that may result in printing aberrations.

Configuring the copying assembly can further comprise increasing an image resolution by mechanical and/or computational techniques. In an embodiment, image resolution is increased by capturing multiple images of an object using different exposure times and/or illumination levels and/or slightly varied CMOS image sensor positioning, aligning multiple images for image processing using one or more fiduciaries disposed within the housing for position feedback of the CMOS image sensor, and combining the multiple images to produce a comprehensive image with increased resolution. Image processing such as combining images can be performed according to well-known techniques.

Configuring the copying assembly can further comprise configuring the illumination source to provide a different color illumination for each of multiple sequential images captured by the CMOS image sensor to allow reconstruction of a color image using data of an illuminant color used to capture each image. The CMOS image sensor can be designed without a color mosaic filter or a color mosaic filter may be removed in one or more embodiments.

The illumination source can be configured by configuring two or more illumination sources for each different color of illumination. The two or more illumination sources for each different color can be disposed at different locations and can be configured to sequentially capture images from the different locations to create a combined image with reduced reflection. Embodiments of reducing reflection effects are further described with respect to FIG. 3. Method 400 may comport with actions and techniques already described with respect to FIGS. 1-3.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A multi-function device comprising:
   a housing;
   a printing assembly comprising an optical photoconductor disposed within the housing at a first height, the printing assembly being configured to print a document; and a copying assembly comprising
   a complementary metal-oxide-semiconductor (CMOS) image sensor and an illumination source, wherein at least one of (i) the CMOS image sensor or (ii) the illumination source is disposed within the housing at a second height that is at or below the first height at which the optical photoconductor is disposed within the housing, and
   a substantially flat transparent surface disposed in an optical path of the CMOS image sensor,
   wherein the substantially flat transparent surface is configured to support an object for image capture by the CMOS image sensor,
   wherein the illumination source is configured to provide illumination of the object on the substantially flat transparent surface during image capture, and
   wherein the CMOS image sensor is configured to capture an entire image of the illuminated object with a single image capture action.

2. The multi-function device of claim 1, wherein the housing comprises a substantially flat surface for placement of the multi-function device on a surface external to the multi-function device, the substantially flat surface of the housing being in parallel with the substantially flat transparent surface of the copying assembly, and
   wherein the CMOS image sensor is disposed between the substantially flat surface of the housing and the substantially flat transparent surface of the copying assembly within an area of the housing of the multi-function device shared by the printing assembly such that the optical path of the CMOS image sensor covers an entire area of the substantially flat transparent surface during image capture.

3. The multi-function device of claim 1, wherein the printing assembly further comprises a laser module for laser printing and the optical photoconductor is operatively coupled with the laser module, the multi-function device further comprising:
   an input tray to receive the document for printing by the printing assembly;
   a pick mechanism to move the document through a printing pathway; and
   a cover coupled to the multi-function device,
   wherein the cover is configured to
      transition between an open position and a closed position,
      cover the entirety of the substantially flat transparent surface of the copying assembly in the closed position, and
      function as an output tray for a printed document while in the closed position.

4. The multi-function device of claim 3, wherein the multi-function device further comprises at least one of:
   an interlock to disable the laser module when the cover is in an open position; and
   a filter coating on the substantially flat transparent surface to block laser light of the laser module.

5. The multi-function device of claim 3, wherein the optical photoconductor is configured to rotate when the cover is in the open position or when the illumination source is enabled to reduce exposure of the optical photoconductor to ambient or illuminative light.

6. The multi-function device of claim 3, wherein the multi-function device further comprises a moveable shade structure operatively coupled with the cover, and wherein the moveable shade structure is configured to prevent or reduce exposure of the optical photoconductor to ambient light when the cover is in the open position.

7. The multi-function device of claim 3, wherein the illumination source is further configured to pre-condition the optical photoconductor to reduce ghosting effects in a laser printing of the laser module.

8. The multi-function device of claim 1, wherein the CMOS image sensor comprises:
   an active pixel sensor (APS); and
   the illumination source comprises at least one light emitting diode (LED), or a cold cathode fluorescent lamp (CCFL).

9. The multi-function device of claim 1, wherein the copying assembly is further configured to increase an image resolution by:
   capturing multiple images of the illuminated object using different exposure times or illumination levels, and using slightly varied CMOS image sensor positioning;
   aligning the multiple images for image processing using a fiduciary disposed within the housing for providing CMOS image sensor position feedback; and
   combining the multiple images to produce an image having increased resolution, as compared to an image produced by capturing a single image of the illuminated object.

10. The multi-function device of claim 1, wherein:
   the CMOS image sensor does not comprise a color mosaic filter; and
   the illumination source is further configured to provide a different color of illumination for each of multiple sequential images captured by the CMOS image sensor to allow for a reconstruction of a color image using data associated with an illuminant color used to capture each sequential image.

11. The multi-function device of claim 10, wherein:
   the illumination source comprises two or more illumination sources for each different color of illumination, the two or more illumination sources for each different illuminant color being disposed at different locations within the housing; and
   the two or more illumination sources for each different color of illumination are configured to provide a distributed illumination during the image capture of each sequential image to reduce an amount of illumination reflection.

12. A method of assembling a multi-function device, the method comprising:
   providing a housing;
   configuring a printing assembly within the housing to print a document; and
   configuring a copying assembly comprising
      a complementary metal-oxide-semiconductor (CMOS) image sensor, wherein the CMOS image sensor is disposed within the housing at or below a height level at which at least one component in the printing assembly is disposed within the housing,
      an illumination source disposed within the housing, wherein the illumination source is configured to provide illumination of an object during image capture, and
      a substantially flat transparent surface disposed in an optical path of the CMOS image sensor,
      wherein the substantially flat transparent surface is configured to support the object during the image capture by the CMOS image sensor, and wherein the CMOS image sensor is configured to capture an entire image of the object with a single image capture action.

13. The method of claim 12, wherein providing the housing comprises:
providing a substantially flat surface of the housing to facilitate placement of the multi-function device on a surface external to the multi-function device, the substantially flat surface of the housing being in parallel with the substantially flat transparent surface of the copying assembly,
wherein the CMOS image sensor is disposed between the substantially flat surface of the housing and the substantially flat transparent surface of the copying assembly within an area of the housing of the multi-function device shared by the printing assembly, such that the optical path of the CMOS image sensor covers an entire area of the substantially flat transparent surface during image capture.

14. The method of claim 12, wherein the method of assembling the multi-function device further comprises:
configuring an input tray to receive a document for printing by the printing assembly;
configuring a pick mechanism to move the document through a printing pathway; and
coupling a cover to the multi-function device,
wherein the cover is configured to
transition between an open position and a closed position,
cover the substantially flat transparent surface of the copying assembly, and
function as an output tray for the document while in the closed position, and
wherein configuring the printing assembly comprises:
configuring a laser module for laser printing; and
configuring an optical photoconductor to be operatively coupled with the laser module.

15. The method of claim 14, wherein assembling the multi-function device further comprises at least one of:
configuring an interlock to disable the laser module when the cover is in an open position; and
providing a filter coating on the substantially flat transparent surface to block laser light of the laser module.

16. The method of claim 14, wherein configuring the optical photoconductor comprises configuring the optical photoconductor to rotate when the cover is in the open position or when the illumination source is enabled to reduce exposure of the optical photoconductor to ambient or illuminative light.

17. The method of claim 14, wherein assembling the multi-function device further comprises:
configuring a moveable shade structure to be operatively coupled with the cover, wherein the moveable shade structure is configured to prevent or reduce exposure of the optical photoconductor to ambient light when the cover is in the open position.

18. The method of claim 14, wherein configuring the copying assembly further comprises:
configuring the illumination source to pre-condition the optical photoconductor to reduce ghosting effects in a laser printing of the laser module.

19. The method of claim 12, wherein configuring the copying assembly further comprises increasing an image resolution of the copying assembly by:
capturing multiple images of the object using different exposure times or illumination levels, and using slightly varied CMOS image sensor positioning;
aligning the multiple images for image processing using a fiduciary disposed within the housing for providing position feedback of the CMOS image sensor; and
combining the multiple images to produce an image with increased resolution, as compared to an image produced by capturing a single image of the object.

20. The method of claim 12, wherein the CMOS image sensor does not comprise a color mosaic filter and wherein configuring the copying assembly further comprises:
configuring the illumination source to provide a different color of illumination for each of multiple sequential images captured by the CMOS image sensor to allow for a reconstruction of a color image using data associated with an illuminant color used to capture each sequential image.

* * * * *